Figure 1:
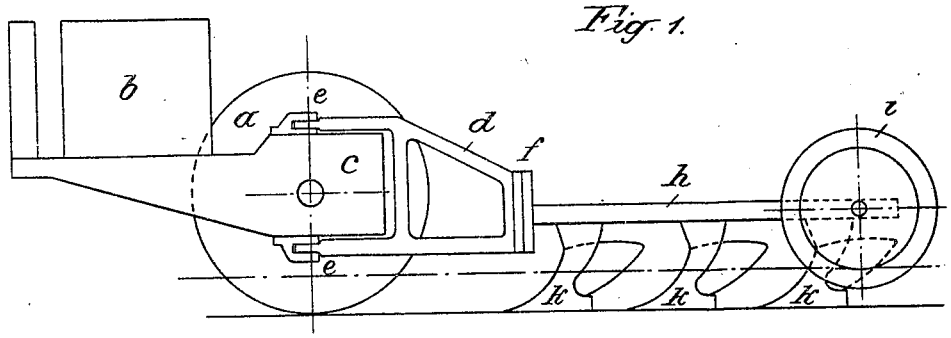

Nov. 4, 1924.

R. BERNSTEIN 1,514,075

AUTOMOBILE AGRICULTURAL MACHINE

Filed July 14, 1920

Inventor:
Rudolf Bernstein

Patented Nov. 4, 1924.

1,514,075

UNITED STATES PATENT OFFICE.

RUDOLF BERNSTEIN, OF HALLE-ON-THE-SAALE, GERMANY.

AUTOMOBILE AGRICULTURAL MACHINE.

Application filed July 14, 1920. Serial No. 396,325.

*To all whom it may concern:*

Be it known that I, RUDOLF BERNSTEIN, a citizen of the Empire of Germany, residing at Halle-on-the-Saale, Prussia, Germany, have invented certain new and useful Improvements in Automobile Agricultural Machines, of which the following is a specification.

My invention refers to automobile agricultural machinery and more especially to motor ploughs and its particular object is a reliable low-priced all-round machine of this kind, easy to steer and of medium working capacity.

The machine according to the present invention comprises two running wheels fixed to a fore-truck adapted to be steered, the driving power being always distributed in the same proportion upon the two wheels, as is generally the case when differential gears are employed. To the fore-truck a frame carrying the working appliance proper, such as a plough, is connected by aid of a pivot having its axis disposed substantially vertically and close to the wheel axle or intersecting it. It is essential to have that part of the frame which is being put under tensile stress, disposed below the upper vertex of and between the running wheels so as to impart to it as low a position as possible. This renders the whole frame rather light and at the same time very strong as compared with the old type of machine where this frame member is bent above and across the wheels in order to allow them a passage below the frame when the carriage is turning. For the same reason the running wheels in a vehicle according to this invention may be given any desired diameter without taking the frame into consideration, the wheel diameter being determined solely by the exigencies of the lowest driving resistance and the best effect obtainable with the gripping strips disposed on the circumference of the felloes.

As the driving power is being transmitted to both running wheels in the same proportion throughout and as each wheel is free to change its velocity relatively to the other, the circumference force remaining constant, the forces transmitted to the wheels can never transmit any lateral bending stresses worth speaking of upon the frame member aforesaid. Therefore, this member can be made rather narrow in a horizontal direction. The plough according to this invention resembles in this respect a drag plough where no lateral stiffness is required for the member connecting the plough proper with the fore-truck. On the other hand, the connecting member in the new plough is stiffened in a vertical direction in order to convert the plough into a carrying plough able to take up the tensions produced by the resistances generated in working and driving. A carrying plough, as is well known, is a plough having its motor carried by the plough structure so as to require a minimum of running wheels and frame members.

Figure 2:
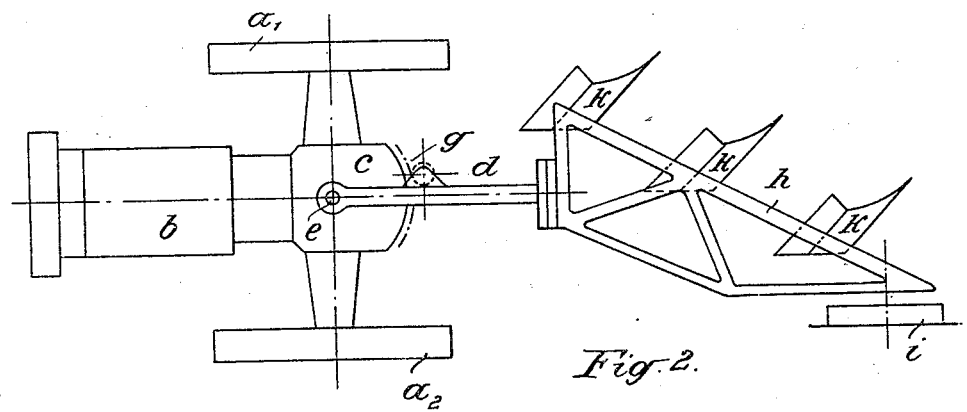
Figure 3:
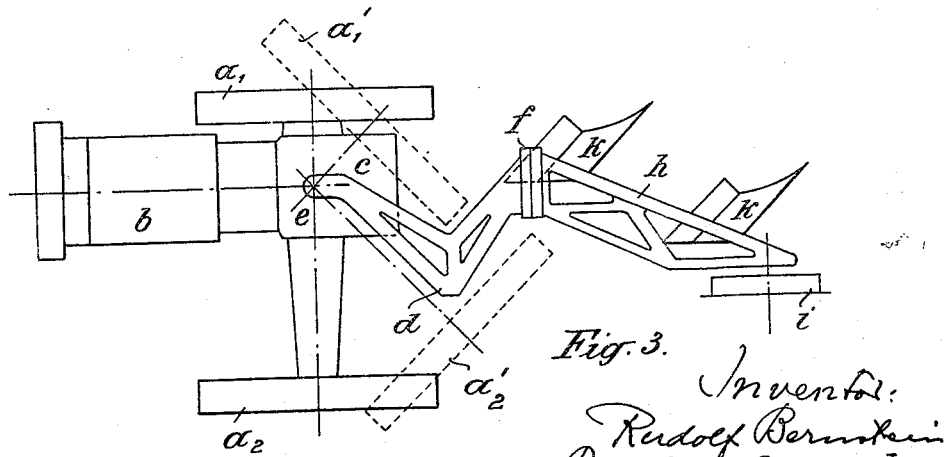

Further particulars and advantages of the invention will appear from the description and the drawings affixed to this specification and forming part thereof where two modifications of a motor plough according to the invention are represented in a purely diagrammatical way, Fig. 1 being an elevation and Fig. 2 a plan of one modification, while Fig. 3 is a plan of the other modification.

According to Figs. 1 and 2, the running wheels $a_1$ $a_2$ are combined with the motor $b$ and gearing $c$ so as to form a truck, the gear case forming the vehicle frame and carrying the motor, serving as a counterweight for the plough, and the running wheels. The gear case itself or its projection carrying the motor preferably also forms the crank case of the motor.

The fore-truck described is pivotally connected to the bifurcated narrow frame member $d$ extending over and below it by means of an axle $e$. A toothed sector $g$ or the like serves for turning the truck around this axle, which is disposed substantially vertically and in the modifications shown in the drawings intersects the wheel axle although it might as well cross it at some distance.

To the narrow frame member $d$ the plough structure $h$ is connected in the same way as in the normal carrying plough, the structure $h$ resting on a rear wheel $i$ which however is not designed to serve as a steering wheel. Plough shares $k$ are arranged on the structure $h$ and some sort of a connection such as $f$ may be inserted between $d$ and $h$, allowing the plough structure to be replaced by some other appliance, such as a binder or any other agricultural machine, the combination thus formed being in every case a self-contained power-driven forward steered appliance.

The gearing $c$ comprises a differential and therefore the motor power is permanently distributed upon the running wheels $a_1$ and $a_2$ in the same proportion, the wheels being nevertheless free to turn with different speed relatively to each other, their peripheral force remaining constant. Therefore, as the ratio of the forces acting on the ends of the wheel axle remains constant, as is usual with differential gears, the connecting joint $e$ being disposed adjacent to the vertical plane passing through the axle and dividing said axle at the inverted ratio of the driving forces acting upon the running wheels, the new machine offers the further advantage that the resistance forces cannot exert any greater moments adapted to render steering difficult.

In accordance with the conditions explained above the intermediate frame member $d$, whose lower part is put under tensile stress in the first line, is very narrow. In consequence thereof, although, contrary to the older types, where this member extends across the wheels, the lower part of member $d$ is located below the vertex of the wheels and between these at about the level of the axle, the wheels can nevertheless turn about a rather wide angle without being incommodated by the frame. This is the case even though the wheels have a normal diameter such as required in order to lower the driving resistance and to warrant a good working of the gripping strips provided on the circumference of the wheels as on the usual tractor wheels.

It is well known that with the old machines the bent frame necessitates employing wheels of a diameter which is for practical purposes far too small.

In the modification shown in Fig. 3 the guide axle $e$, instead of being disposed at an equal distance from the wheels, is placed nearer to one of the wheels. This arrangement has proved useful in the case where the normal breadth of working of the machine is considerably smaller than the gage and can easily be reduced to practice by employing an unsymmetric differential gear. In this case the resultant of the forces of resistance does not act upon the middle of the wheel axle but upon a point nearer to the furrow wheel; at the inverted ratio of the different driving forces transmitted upon the running wheels the steering axis is placed nearer to the furrow wheel. If in such a case a substantially straight frame member $d$ such as shown in Fig. 2 were employed, the furrow wheel $a_1$ would strike the said member at a very small angle of alteration of the course towards the worked soil. According to Fig. 3 therefore the said frame member has an angular configuration, thus permitting the wheel $a_1$ near the axle $e$ to enter into the angle thus formed while the other wheel $a_2$ is free to turn around the apex of the angle as shown by the broken line positions.

I wish it to be understood that I do not intend to limit myself to a constant proportion of the driving forces acting upon the wheels, as the invention is equally well applicable to machines having two different gears adapted to be thrown in optionally, each gear distributing the driving force upon the wheels at constant ratio which is however different with each gear.

The point-like support for the plough frame formed by the wheel $i$ may be replaced by a slide shoe or by a plurality of wheels or slide shoes assembled close together or by a rear truck linked to the plough share. In this latter case the rear truck pivot forms a point-like support for the plough.

I claim:—

An agricultural machine comprising in combination a single-axle motor truck, a vertical pivot pin provided in the main body-portion of the said truck situated in a vertical plane passing through the axis of the said truck, and a frame-member of triangular shape linked by the said pivot pin to the said truck so as to have a swivel connection therewith, and adapted for having attached to it a working implement, the said pivot pin being located nearer the one wheel of the said truck than to the other wheel thereof.

In testimony whereof I affix my signature in presence of two witnesses.

RUDOLF BERNSTEIN.

Witnesses:
 HANS KÖRBER,
 FRIEDRICH REIF.